United States Patent Office 2,834,712
Patented May 13, 1958

2,834,712

URINARY ESTROGEN COMPOSITIONS AND METHODS FOR PREPARING THEM

Desmond Beall, Westmount, Quebec, and Gordon A. Grant, Mount Royal, Montreal, Quebec, Canada, assignors, by mesne assignments, to American Home Products Corporation, New York, N. Y., a corporation of Delaware No Drawing. Application May 27, 1953
Serial No. 357,898

5 Claims. (Cl. 167—74.5)

This invention relates to the preparation of hormone compositions and, more particularly, to the preparation of estrogenic compositions of substantial purity and low toxicity.

An object of the invention is to prepare hormonal compositions from equine urinary material of such purity as to be capable of use as an intravenous pharmaceutical. It is a further object of the invention to prepare an estrogenic product from equine urine substantially free of urinary odors and capable of use as a topical medicinal. A further object is the preparation of an estrogenic hormonal product which is orally effective for the treatment of the menopausal syndrome. It is a further object to provide a process for obtaining an estrogenic product of high potency and relatively low toxicity.

In the Beall and Grant application Serial No. 64,834, filed December 11, 1948, now Patent No. 2,696,265, there is described a process for obtaining an estrogenic therapeutic product from equine urinary material which is of substantial potency and capable of use as an oral medicament to alleviate the menopausal syndrome. The process disclosed in that application involves the extraction of the water-soluble estrogenic orally active substances from substantially unhydrolyzed equine urine utilizing an organic solvent of the type that is substantially water-insoluble. As disclosed in that case, the solvent could be an alcohol or ketone having a water-solubility of less than about 6% and a preferred solvent as disclosed therein was hexanol. The estrogenic materials were selectively taken up by the solvent leaving behind substantially all of the proteinaceous material and large amounts of the high molecular weight aliphatic amines and diamines. Following the procedures disclosed in that case, a product could be obtained containing upwards of about 20% estrogenic components. The present invention is a continuation-in-part of said Beall and Grant application.

The process described in the above identified prior application while producing a product of satisfactory potency was not capable of yielding a product that could be used intravenously without further treatments. The present invention deals with the preparation of special compositions of matter by modification and expansion of the above described procedure. As will be described, the present invention discloses a method for preparing intravenous compositions as well as other preparations requiring the use of high potency, substantially unhydrolyzed water-soluble estrogenic conjugates practically free from all toxic elements that prohibit its use for the purposes intended.

It should be realized that many natural substances in urine have been rendered physiologically non-toxic but these same substances become highly toxic when complexes are broken down, or certain substances such as the phenolic compounds are reduced to free bases or acids instead of salts or esters, either through bacterial action or by the treatment which seeks to isolate the estrogenic potency.

It is obvious that a parenteral preparation must be non-toxic at the dosage levels used and this is particularly important when considering an intravenous preparation. To obtain an intravenous medicinal from equine urine containing not only high amounts of foreign proteins but pyrogens, various amines and diamines, indoxyl, or free phenolic and cresylic compounds is a difficult problem; and the problem is often further complicated by the presence of substantial bacterial contamination in the raw urinary fluids at the time of its collection. Even the best prior equine urinary compositions contained substantial amounts of contaminants, the most toxic of which, from the viewpoint of an intravenous use, were the pyrogens, indoxyl, and the low molecular weight phenolic compounds, particularly the cresols.

In carrying out the method for obtaining the estrogenic product of the invention, pregnant mare's urine is extracted with an organic solvent in which the estrogenic potency is selectively soluble. This solvent may be the relatively water-insoluble (less than about 6%) aliphatic alcohols or ketones. While hexanol is the preferred solvent of these two classes of compounds, one may also use cyclohexanol, methyl-cyclohexanol, cyclohexanone or a isophorone as disclosed in the earlier application, Serial No. 64,834, identified hereinabove.

It should be pointed out, at this time, that the urinary material is preferably treated while fresh or, if this is difficult, the urine is suitably preserved to prevent substantial hydrolysis. Any suitable preservative may be used, with a mixture of alcohol and chloroform being preferred.

In place of the aliphatic alcohols or ketones of limited water solubility, one may selectively remove the estrogenic potency from equine urinary material provided it be in the form of an amine salt by extracting with benzene or with a chlorinated aliphatic solvent. The procedure for extracting estrogenic factors by this method is more fully disclosed in the application of Deans, Scarrow and Beall, Serial No. 166,074, filed June 3, 1950 now Patent No. 2,711,988. A preferred method as disclosed in the latter case, is the reaction of the estrogens in the equine urinary material with a nitrogenous base salt, thus forming estrogenic salts of alkyl amines, unsubstituted cycloalkyl amines, unsubstituted mono-cyclo aromatic-hydrocarbon amines, p-amino-acetophenone, dimethyl aminotoluene, procaine, pyridine, aminopyridines and mixtures thereof. After forming the amine salt of the conjugated estrogens, they are thereby rendered soluble in an organic solvent such as benzene or low molecular weight liquid chlorinated aliphatic hydrocarbons, and one of these solvents selectively separates the estrogens from the undesired urinary matter. Among the solvents mentioned, ethylene dichloride is preferred.

Regardless of what type of organic solvent extraction is utilized, the estrogenic factors are removed from the solvent and treated to remove inorganic salts, odoriferous phenols and other undesired urinary substances. The product from either the Beall and Grant process or the Deans, Scarrow and Beall process is now treated to remove pyrogens, indoxyl, and cresol compounds. These substances must be removed in order to obtain a product of sufficient purity and low toxicity as to permit intravenous administration without dangerous side-effects.

The partially purified product, after the removal of the large bulk of proteins, amines, diamines and inorganic salts, is now treated with an aqueous saturated salt solution utilizing an alkili metal sulfate, phosphate, or chloride, the sodium and potassium salts being preferred. This step has been found to selectively precipitate the estrogenic potency leaving in the aqueous solution substantially all of the toxic materials heretofore mentioned. The precipitate is filtered and is extracted with an aliphatic ketone containing a small amount of an alcohol which selectively dissolves the estrogenic conjugates to the exclusion of the major amount of the inorganic salt used for precipitation. As a final step, water is added to the solvent solution and the product is concentrated to remove substantially all of the solvent leaving the concentrate in aqueous solution. This concentrate may either be utilized directly in the preparation of the intravenous product or directly incorporated in an ointment base or it may be dried under vacuum conditions, preferably by lyophilization (freeze-drying), prior to utilization for the purpose desired.

In treating the partially purified estrogenic concentrate with the salt solution and in all of the succeeding steps, it is necessary to exclude pyrogens where an intravenous product is to be made. Stainless steel equipment and all glassware must be made absolutely clean to prevent contamination with pyrogens and double distilled water must be used in all aqueous solutions.

Besides the removal of indoxyl and cresylic compounds, as well as pyrogens, an important factor involved in the preparation of an intravenous product from equine urine is that of stability. In relatively crude extracts, natural stability factors are apparently present since it has been found that these products have a relatively high order of stability as compared to more highly purified estrogenic compositions. In the preparation of an intravenous product utilizing the novel, high potency estrogenic product, it has been discovered that a requirement of such composition is for an agent to maintain the stability of the conjugates and prevent their destruction. Relatively pure estrogenic conjugates are highly unstable particularly in the presence of moisture. Where moisture is present, or under aqueous conditions, an acid environment forms which quickly destroys the product. An important discovery is the finding that buffering agents, capable of maintaining a substantially neutral environment with a pH from about 6.5 to 7.5, prevent deterioration of the estrogenic composition.

Buffering or stabilizing agents useful with the estrogenic conjugates of the invention are the alkali metal salts of organic or inorganic acids which are capable of maintaining a substantially neutral pH in the range of about 6.5 to 7.5 with a preference to the slightly alkaline side. Any of the well-known buffering salts or buffering mixtures may be utilized provided they are substantially non-toxic in the amounts used and are capable of maintaining the desired hydrogen ion concentration.

As examples of preferred buffering mixtures may be mentioned sodium or potassium dihydrogen phosphate together with either sodium or potassium hydroxide, disodium or dipotassium monohydrogen phosphate or trisodium or tripotassium citrate. Another buffer mixture suitable for use in the present invention is either sodium or potassium mono-hydrogen phosphate together with hydrochloric acid, sulfuric acid, citric acid or disodium or dipotassium citrate. Another buffer mixture may be disodium or dipotassium citrate together with trisodium or tripotassium citrate, or, in lieu of the latter, sodium or potassium hydroxide. One may also use trisodium or tripotassium citrate with either citric acid, hydrochloric acid, or sulfuric acid. As another example, potassium hydrogen phthalate with sodium or potassium hydroxide or dipotassium phthalate with hydrochloric acid or sulfuric acid are also effective. Many other buffering materials as taught in the text "Determination of Hydrogen Ions" by W. M. Clark may be used besides those mentioned herein provided they are substantially non-toxic and effect a hydrogen ion concentration in the pH range indicated.

For intravenous preparations, the minimal concentration of stabilizing or buffering agent necessary to attain good stability is $\frac{1}{100}$ molar. Considerably higher amounts may be used without deleterious effect up to the point of causing salting out. A preferred range, however, is between about $\frac{1}{10}$ and $\frac{1}{20}$ molar. The molar concentration, of course, refers to either a single buffering material or a combination or mixture of buffering materials.

In order to permit the drying of the estrogenic concentrate which is quite hygroscopic, and, in addition, to obtain a desirable bulk for intravenous injection, it is also necessary to provide a carrier which is soluble and, of course, non-toxic in blood fluids. Such a carrier and drying aid is preferably lactose although one may also use dextrose, galactose, pectin, gelatin, dextran, polyvinylpyrrolidone, or any other agent capable of acting as a carrier for the estrogenic potency, permitting easy drying of the product, and having the characteristics noted above.

The intravenous composition has been found especially useful in the treatment of functional uterine bleeding. At the present time, the usual treatment consists of either curettage, where rapid hemostasis is required, or the oral ingestion of estrogenic conjugates, where an emergency condition is not present. In the latter case, control of bleeding is effective within two to five days. By the use of the estrogenic product of the invention, the intravenous preparation is substantially more effective since hemostasis will take place within two to eight hours.

The intravenous preparation is also deemed of considerable importance in the treatment of atherosclerosis. It has been found that as little as about 0.1 of a milligram per kilogram of body weight, administered intravenously once a week, will restore cholesterol metabolism to normal, and restore disturbed ratios of phospholipids to cholesterol, and ratios of alpha-lipo-protein to beta-lipo-protein. For such disease, synthetic estrogens are ineffective while oral or parenteral estrogens require such high levels as to result in such untoward side effects as to prohibit their use.

Still another use for the highly purified estrogenic product is its utilization, suitably buffered, in an ointment or cold cream base carrier for the topical treatment of Acne vulgaris. Because of the freedom from a large proportion of objectionable urinary solids but particularly because of the freedom from low molecular weight phenols and cresols, the estrogenic product may be incorporated in a cream for topical use whereas earlier products of this type were so odoriferous as to bar their use as a topical medicament.

In addition to the utilities noted above, the estrogenic product of the invention may be utilized as an oral medicament in the form of tablets for the treatment of the menopausal syndrome. In preparing the tablets, the estrogenic product is combined with a buffering agent and sufficient carrier is incorporated to provide a tablet of suitable size and potency. Tablets containing from 0.625 to about 2.5 milligrams of the conjugated estrogens (expressed as sodium estrone sulfate), when taken daily, have been found effective in practically every case to give substantial relief from the common, autonomic, emotional and mental disorders of the menopausal syndrome.

In preparing the intravenous product, one combines the estrogenic concentrate of the invention with the buffering material and water-soluble carrier, all dissolved in water. The pH of the solution is carefully checked and adjusted to within a pH of 6.5 to 7.5 with a preferred pH from about 7.2 to 7.4. The solution is filtered through a bacteriological filter, placed in vials and dried by lyophilization. This product, when reconstituted with sterile pyrogen-free water, is suitable for intravenous injection.

In preparing the topical medicaments, the purified estrogenic concentrate is combined in a blender or mixer with an ointment base or vanishing or cold cream base carrier. A typical ointment base material comprises glycerol monostearate, cetyl alcohol, glycerine, spermaceti, methylstearate, methyl-p-hydroxy benzoate and p-chloro-metacresol. In the standard non-drying cold cream bases, a typical mixture is glycerol-titanium dioxide suspension, hydrated magnesium aluminum silicate, glycerol monostearate, cetyl alcohol, beeswax, spermaceti, methylstearate, heavy mineral oil, propylene glycol monostearate, sodium lauryl sulfate, sodium benzoate and methyl-p-hydroxy benzoate.

Another form of the topical medicament is the liquid type containing alcohol, glycerol and a buffering agent to secure a pH substantially in the range of neutrality and preferably on the slightly alkaline side.

The following examples illustrate the invention in greater detail. It should be clearly understood that these examples are essentially for illustrative purposes and are not intended to be limitative of the invention.

*Example 1*

100 gallons of pregnant mares' urine, suitably preserved to prevent material hydrolysis, is extracted with 40 gallons of hexanol. The spent urine is removed and the hexanol extract is washed with 4 gallons of 8% sodium hydroxide in water. The aqueous phase is discarded. The washed hexanol is concentrated in vacuo to 2 gallons. To the hexanol concentrate is now added 2 volumes (approximately 4 gallons) of hexane. The alcohol-hydrocarbon mixture is then washed once with ½ gallon and twice with ¼ gallon of water. The estrogenic potency goes into the water solution and the hexane-hexanol fraction is discarded. The crude aqueous concentrate is adjusted to a pH between 7.0 and 7.5, diatomaceous earth is added and the mixture is dried in vacuo.

The dried cake is dissolved in a minimal amount of methanol which is then concentrated in vacuo to approximately 6 to 10 liters. The methanol solution is then poured into 15 volumes of acetone (15 times the volume of methanol solution). The precipitate which forms is filtered and washed with 97% acetone and 3% methanol, the washed liquid being added to the filtrate. The filtrate is now cnocentrated in vacuo to a small volume, 10 liters of water are added and the concentration is continued to remove the organic solvents.

The concentrate is made up to 10 to 12 liters of water. The pH of the solution is adjusted to approximately 5.0 with hydrochloric acid and the acid solution is rapidly washed with one wash of ¼ volume benzene and another wash of ¼ volume of ether. The wash liquids are discarded. Water is added, the solution is neutralized and adjusted to approximately pH 7.5 with sodium hydroxide solution, and the product is distilled to remove organic solvents and to reduce the product to approximately 10 to 12 liters of aqueous, partially purified concentrate.

To the aqueous concentrate is now added 2 volumes (20 to 24 liters) of saturated sodium chloride solution which precipitates the potency. A filter aid such as diatomaceous earth is added and the estrogenic precipitate is separated from the aqueous medium by filtration. This precipitate is extracted with 97% acetone and 3% methanol. Water is added to the organic solvent solution and the mixture is concentrated in vacuo to give approximately 2.5 gallons of water free of organic solvents and containing the conjugated estrogens in purified form. The pH of the solution is adjusted to approximately 7.0 to 7.5.

*Example 2*

About 100 gallons of suitably preserved pregnant mares' urine is extracted with 40 liters of ethylene dichloride containing 1% dicyclohexylamine acetate by weight. The solvent extract is washed three times with 1 gallon and once with a half gallon of 2% sodium hydroxide solution in water. The aqueous alkaline extract is washed with a small amount of ethylene dichloride and the spent chlorinated solvent together with the wash liquid is discarded. The aqueous solution is adjusted to a pH of 7.5 and is concentrated in vacuo to dryness forming a dry cake which may then be treated in the manner disclosed in the preceding example.

The product of the invention has been found to contain the majority of the female sex hormones in the form of sulfates. Identified compounds are the sulfates of estrone, equilin, equilenin, β-estradiol, dihydroequilenin and β-dihydroequilenin. These are combined with relatively non-toxic urinary solids, the estrogenic content being at least about 40% by weight, and, as described in the above examples, ranging from about 40% to about 50% by weight, and comprising the sulfates of estrone, equilin, α- and β-dihydroequilin, equilenin, β-dihydroequilenin and β-estradiol.

If a higher purity of about 90–95% or somewhat purer product is desired, the aqueous final concentrate as produced by the procedures described above is dried in vacuo and dissolved in benzene containing a minimal percentage of alcohol to effect solution. The solution is then passed through a column of activated alumina which retains the estrogenic potency. Elution is carried out with the same solvent mixture as mentioned, preferably an aromatic hydrocarbon, such as benzene, combined with a lower aliphatic alcohol of 1 to 4 carbon atoms, the alcohol being present in the mixture to the extent of about 10–50% by volume. The eluate is then concentrated in vacuo, the concentrate is taken up in water and is suitably buffered to a pH of about 7.5. While one may achieve about 95% purity or even higher by this procedure, a product of such purity is not of paramount importance for the uses described herein.

*Example 3*

To prepare an intravenous preparation, a purified liquid concentrate, prepared as described in the preceding Examples 1 and 2 and free of pyrogens, indoxyl, and cresol compounds, is combined with a buffering agent and a bulking agent or carrier.

About 6 to 8 liters of the estrogenic concentrate containing 15 to 20 milligrams per milliliter of conjugated estrogens (expressed as sodium estrone sulfate) is combined with 62 grams of sodium citrate dissolved in 4 liters of water to which has been added 250 grams of lactose. The aqueous solution is made up to 20 liters with double distilled water. The pH of the solution is adjusted to approximately 7.2 to 7.4 with 5% hydrochloric acid or sodium hydroxide as required. The buffered solution is filtered through a bacteriological filter, filled sterilely into vials and lyophilized. This product, when reconstituted with pyrogen-free double distilled water, is an effective intravenous medicament.

*Example 4*

To prepare a topical medicament for the treatment of *Acne vulgaris,* 2.5 liters of estrogenic conjugates containing 50 milligrams per milliliter (expressed as sodium estrone sulfate) is combined with 97 kilograms of standard ointment base to which has been added sufficient red coloring material to impart a flesh color to the product. Water is added in an amount to bring the entire product to 100 kilograms of cream. This is filled sterilely into jars or tubes and provides approximately 1.25 milligrams of conjugated estrogens per gram of ointment base.

*Example 5*

A topical liquid medicament also suitable for the treatment of *Acne vulgaris* is made up by combining the purified liquid estrogenic concentrate containing 93.75 grams of conjugates (expressed as sodium estrone sulfate) with 50 liters of glycerol and 2800 grams of sodium citrate. Sufficient 95% ethyl alcohol is added to give a final concentration of approximately 12.5% alcohol. Water is added to bring the product to 500 liters which is finally adjusted to a pH of approximately 7.3 to 7.5.

Many modifications, as pointed out earlier, may be made within the scope of the invention. In the process for obtaining the purified estrogenic concentrate, one may use in place of hexane, pentane or heptane. These materials cause the transfer of the potency from the hexanol solution to the aqueous phase. The acetone-methyl alcohol solvent is utilized essentially to separate the estrogenic potency from the inorganic salts. In place of acetone, one may use any lower aliphatic ketone such as methylethyl ketone. Instead of the methyl alcohol used with the acetone, one may use any lower aliphatic alcohol such as ethyl, isopropyl or butyl alcohols. In the solvent extraction under acid conditions, one may alternatively wash the estrogenic material with ethylene dichloride in place of the benzene and ether. Instead of using saturated sodium chloride solution, other alkali metal saturated salt solutions may be used provided these salts are relatively non-toxic. Preferred salt solutions are the sodium and potassium sulfates, phosphates and chlorides.

In the use of buffering agents to impart stability to the estrogenic product, one may use in place of the sodium citrate of the examples any non-toxic buffering agent which is soluble in blood fluids and capable of providing a pH within the range of about 6.5 to 7.5, preferably on the slightly alkaline side. With regard to the carrier or drying agent, in place of lactose one may use any non-toxic material that is water-soluble, soluble in blood fluids and capable of giving body and helping in the drying of the product. Besides lactose, preferred carrier agents are those which have been mentioned earlier. With regard to the topical cream medicament, while a standard ointment base of the vanishing cream type was given in the example, one may also utilize a non-drying cold cream containing the standard and well-known ingredients for this type of product.

We claim:

1. A pharmaceutical composition comprising an estrogenic component and a buffering agent, said estrogenic component comprising water-soluble estrogenic conjugates in pregnant mares' urine in unhydrolyzed form, including the sulfates of estrone, equilin, equilenin, $\beta$-estradiol and $\beta$-dihydroequilenin commingled with relatively inert and non-toxic urinary solids, the estrogenic content being at least about 40% of estrogenic conjugates by weight and being substantially free of pyrogens, indoxyl and cresol compounds, while said buffering agent comprises a non-toxic alkali metal salt capable of stabilizing and maintaining the composition at a pH in the range of about 6.5 to about 7.5.

2. A pharmaceutical composition comprising an estrogenic component, a carrier and a buffering and stabilizing agent, said estrogenic component comprising water-soluble estrogenic conjugates in pregnant mares' urine in unhydrolyzed form, including the sulfates of estrone, equilin, equilenin, $\beta$-estradiol and $\beta$-dihydroequilenin commingled with relatively inert and non-toxic urinary solids, the estrogenic content being at least about 40% of estrogenic conjugates by weight and being substantially free of pyrogens, indoxyl, and cresol compounds, while said buffering agent comprises a non-toxic alkali metal salt capable of stabilizing and maintaining the composition at a pH in the range of about 6.5 to about 7.5, and said carrier comprises a non-toxic vehicle for the active therapeutic component.

3. A pharmaceutical composition for intravenous use, comprising an estrogenic component, a carrier and a buffering and stabilizing agent, said estrogenic component comprising water-soluble estrogenic conjugates in pregnant mares' urine in unhydrolyzed form, including the sulfates of estrone, equilin, equilenin, $\beta$-estradiol and $\beta$-dihydroequilenin commingled with relatively inert and nontoxic urinary solids, the estrogenic content being at least about 40% of estrogenic conjugates by weight and being substantially free of pyrogens, indoxyl and cresol compounds, while said buffering agent comprises a non-toxic alkali metal salt capable of stabilizing and maintaining the composition at a pH in the range of about 6.5 to about 7.5, and said carrier for the therapeutic component comprising a vehicle which is substantially non-toxic and soluble in blood fluids at therapeutic dosage levels.

4. A pharmaceutical composition for topical use comprising an estrogenic component, a buffering and stabilizing agent, and a carrier, said estrogenic component comprising water-soluble estrogenic conjugates in pregnant mares' urine in unhydrolyzed form, including the sulfates of estrone, equilin, equilenin, $\beta$-estradiol and $\beta$-dihydroequilenin commingled with relatively inert and non-toxic urinary solids, the estrogenic content being at least about 40% of estrogenic conjugates by weight and being substantially free of indoxyl, low molecular weight phenolic and cresol compounds, while said buffering agent comprises a non-toxic alkali metal salt capable of stabilizing and maintaining the composition at a pH in the range of about 6.5 to about 7.5, and said carrier for the therapeutic component comprising an ointment base which is substantially non-toxic to the skin.

5. The process for obtaining an estrogenic, therapeutic product comprising extracting equine urinary material containing water-soluble estrogenic substances in conjugate form with an organic solvent selected from the group consisting of aliphatic ketones and alcohols having a water-solubility of less than about 6% which selectively removes substantially all of the estrogenic conjugates together with some urinary solids from proteinaceous materials as well as higher aliphatic amines and diamines, washing under acid conditions the extract obtained, with benzene, and then with ether to remove phenolic constituents thus obtaining an estrogenic concentrate substantially free of odoriferous urinary substances, neutralizing the acidity, separating the active estrogenic components substantially free of pyrogens, indoxyl and cresol toxic compounds by contacting said concentrate with a saturated aqueous solution of an alkali metal salt of an acid of the group consisting of sulfuric, phosphoric and hydrochloric acid, said salt solution causing the precipitation of the estrogenic factors substantially free of said toxic components, then extracting the estrogenic components from said precipitated material with a mixture of lower aliphatic ketone and alcohol solvent and finally evaporating off the solvent to obtain the estrogenic potency in highly purified form.

References Cited in the file of this patent

UNITED STATES PATENTS

| 2,001,255 | Langecker | May 14, 1935 |
| 2,429,398 | Cook | Oct. 21, 1947 |
| 2,695,265 | Beall | Dec. 7, 1954 |

FOREIGN PATENTS

| 368,928 | Great Britain | Mar. 11, 1932 |
| 459,536 | Great Britain | Jan. 11, 1937 |

OTHER REFERENCES

Stimmel: Science, vol. 98, No. 2552, November 26, 1943, p. 480.